(12) United States Patent
Schutter

(10) Patent No.: US 12,141,369 B1
(45) Date of Patent: Nov. 12, 2024

(54) ERGONOMIC KEYBOARD ASSEMBLY

(71) Applicant: Kenneth Schutter, Phoenixville, PA (US)

(72) Inventor: Kenneth Schutter, Phoenixville, PA (US)

(*) Notice: Subject to any disclaimer, the term of this patent is extended or adjusted under 35 U.S.C. 154(b) by 0 days.

(21) Appl. No.: 18/733,424

(22) Filed: Jun. 4, 2024

(51) Int. Cl.
*G06F 1/16* (2006.01)
*G06F 3/02* (2006.01)

(52) U.S. Cl.
CPC .......... *G06F 3/0216* (2013.01); *G06F 3/0221* (2013.01)

(58) Field of Classification Search
CPC .... G06F 3/0216; G06F 3/0219; G06F 3/0221; G06F 1/1664; G06F 1/1671; G06F 1/1673
See application file for complete search history.

(56) References Cited

U.S. PATENT DOCUMENTS

| | | | | |
|---|---|---|---|---|
| 5,067,834 A * | 11/1991 | Szmanda | ............... | F16M 11/28 400/489 |
| 5,122,786 A * | 6/1992 | Rader | ................... | G06F 3/0219 400/489 |
| 5,596,480 A * | 1/1997 | Manser | ................. | G06F 1/1669 D14/395 |
| 6,005,496 A * | 12/1999 | Hargreaves | ........... | G06F 3/0202 400/475 |
| 7,324,019 B2 * | 1/2008 | Levenson | ............. | G06F 3/0213 400/489 |
| 9,921,607 B2 * | 3/2018 | Sherlock | ................. | G06F 1/163 |
| 2004/0239631 A1 * | 12/2004 | Gresham | ............... | G06F 3/0216 345/168 |
| 2009/0138637 A1 * | 5/2009 | Hargreaves | ........... | H01H 13/86 361/679.08 |

* cited by examiner

*Primary Examiner* — Anthony Q Edwards

(57) ABSTRACT

Disclosed is an ergonomic keyboard assembly which comprises a first keyboard and a second keyboard each connected to one another via a cable. The keyboard assembly further includes first and second keyboards which are positioned on the respective top surfaces of first and second flat members. The keyboard assembly also includes elongated members positioned on first and second flat members, respectively. The keyboard assembly includes cylindrical knobs rotatably mounted on top surfaces of elongated members respectively. The keyboard assembly further includes first and second L-shaped members connected to the bottom surfaces of flat members respectively and also pivotally connected to each other. The keyboard assembly further includes third and fourth L-shaped members connected to the bottom surface of the flat members and movably connected to the first and second L-shaped member respectively by one or more connecting elements.

10 Claims, 2 Drawing Sheets

ERGONOMIC KEYBOARD ASSEMBLY

FIELD OF THE INVENTION

The present invention relates to a keyboard arrangements and more particularly relates to ergonomic keyboard assembly with multiple degrees of freedom.

BACKGROUND OF THE INVENTION

Users, especially the ones spending hours in using keyboards, typically expect increased productivity as well as improved comfort while using keyboards. Ergonomic keyboards such as split or segmented keyboards and keyboards with variable sized keys, are becoming choice of such users. These keyboards often solve the general purpose of a keyboard. However, they pose significant drawbacks in terms of user convenience which results in physical stress and strain of the user. In addition, the user of traditional keyboards results in carpal tunnel syndrome: the repetitive motions and suboptimal positions of wrists while typing on these keyboards lead to compression of the median nerve in the wrist which results in pain, numbness, and tingling in the hand and fingers.

While existing ergonomic keyboards are split into two sides, they offer limited angle adjustments, which may not adequately accommodate the varying ergonomic needs of users with different wrist, elbow, and shoulder positions. Lack of angle adjustability results in discomfort or strain in the wrists, elbows, and shoulders over prolonged typing sessions, particularly for users with ergonomic sensitivities or pre-existing conditions. Consequently, users may experience decreased typing efficiency and productivity if the angles of segmented keyboard do not align with their ergonomic needs.

Further, keyboards without wrist height adjustability may not satisfy the ergonomic needs of users with varying hand sizes. Furthermore, none of the split keyboards have the swapping capability. The ergonomic keyboards are often non-collapsible due to their complex structure: accommodates multiple components to achieve the ergonomic structure, thus, making them less portable and less convenient for users traveling often. Such complex-structured keyboards apparently lack flexibility in usage and are inconvenience for the users with ergonomic requirements.

Hence there is a need for an ergonomic keyboard assembly that eliminates the physical stress and strain of the user, increases user comfort by providing multiple degrees of freedom to the user and is collapsible for increased portability.

BRIEF SUMMARY OF THE INVENTION

It is an object of the present invention to provide an ergonomic keyboard that eliminates wrist, elbow, shoulder and back strain while maintaining a normal keyboard shape.

It is another object of the present invention to provide an ergonomic keyboard that people are used to and adaptable to various desk heights and configurations.

It is further object of the present invention to provide a keyboard that is adjustable according to the shoulder size of a user.

It is further object of the present invention to provide a keyboard with multiple degrees of freedom while being adaptable to any size of human and adjustable to accommodate multiple physical stress points for any individual.

It is further object of the present invention to provide a collapsible ergonomic keyboard.

According to an embodiment of the present invention an ergonomic keyboard assembly is disclosed. The ergonomic keyboard assembly includes a first keyboard and a second keyboard each connected via a cable. The keyboard assembly further includes a first flat member including a top surface and a bottom surface, wherein the first keyboard is positioned on the top surface and connected therewith by one or more connecting elements. The keyboard assembly also includes a second flat member including a top surface and a bottom surface, wherein the second keyboard is positioned on the top surface and connected therewith by one or more connecting elements. The keyboard assembly includes a first elongated member positioned on the top surface of the first flat member and connected therewith by one or more connecting elements. The keyboard assembly further includes a second elongated member positioned on the top surface of the second flat member and connected therewith by one or more connecting elements. The keyboard assembly includes a first cylindrical knob rotatably mounted on a top surface of the first elongated member and connected therewith using at least one connecting element. The keyboard assembly further includes a second cylindrical knob rotatably mounted on a top surface of the second elongated member and connected therewith using at least one connecting element. The keyboard assembly also includes a first L-shaped member connected to the bottom surface of the first flat member by one or more connecting elements. The keyboard assembly includes a second L-shaped member connected to the bottom surface of the second flat member by one or more connecting elements, wherein the first and second L-shaped members are pivotally connected to each other by one or more connecting elements. The keyboard assembly further includes a third L-shaped member connected to the bottom surface of the first flat member and rotatably connected to the first L-shaped member by one or more connecting elements. The keyboard assembly also includes a fourth L-shaped member connected to the bottom surface of the second flat member and rotatably connected to the second L-shaped member by one or more connecting elements.

BRIEF DESCRIPTION OF DRAWINGS

The present invention will become clearly understood to those of ordinary skill in the art when descriptions of exemplary embodiments thereof are read with reference to the accompanying drawings.

DETAILED DESCRIPTION OF THE INVENTION

Figure 1:
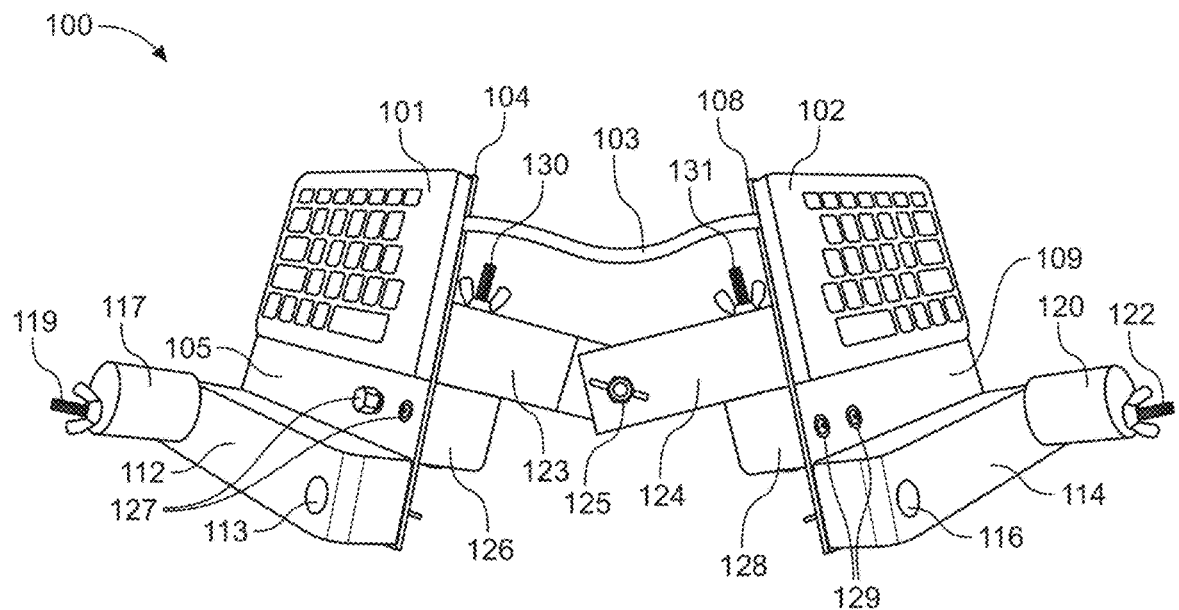
FIG. 1 is a top view of an ergonomic keyboard assembly depicting horizontal angle adjustment.

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. For a more complete understanding of the present invention, reference is now made to the following descriptions taken in conjunction with the accompanying drawings.

The present invention discloses an ergonomic keyboard assembly that helps eliminate wrist, elbow, shoulder and back strain of a user of the keyboard. The ergonomic keyboard arrangement disclosed according to present invention maintains a normal keyboard shape that people are used to and adaptable to various desk heights and configurations. The keys are placed in a natural orientation in the keyboard structure thus reducing strain on the body of the user.

To emphasize the advantages of various body parts being impacted while using the keyboard,
  a. the keys are placed at any angle that is comfortable to the user. Based on the exemplary embodiment of the present invention, split keyboards are separated to approximately shoulder-width apart that eliminates the wrist to remain in bending position while typing. In one embodiment, the wrist rest is configured to be high enough so that the fingers form the appropriate C shape while typing and while not bending the wrist.
  b. adjustable width of split keyboards allows the elbows do not need to be close to the body.
  c. split keyboard allows natural position of the elbows and thus shoulders remain natural position.
  d. the keyboard promotes vertical spine instead of hunching over a laptop.

In an aspect, the present invention allows about seven degrees of freedom enabling the keyboard adaptable to users of any sizes and adjustable to accommodate multiple physical stress points for any individual. To use the invention, the keyboard is adjusted to be configured in a position natural to the user and then tighten the wingnuts to fix it in place.

The seven degrees of freedom include: angle of keyboard to the table, angle of keyboard toe-in (angle the keyboards are pronated towards each other), distance the two split keyboards are apart from each other, height of wrist rest elevation from the keyboard level, lower wrist support knob to adjust for table height and size of hand, keyboard location (forward or back depending on the size of hands) and keyboard swap. These seven degrees of freedom enable reduction of stress on hands and arms, and accommodate personal preferences.

A keyboard assembly having larger keys is replaceable with keyboard having smaller keys and vice versa, which is based on the hand sizes of the users. Further, the keyboard assembly is packable, i.e., the keyboard assembly collapses to a size about half that of existing keyboards with a width half that of standard keyboards.

In various aspects, the ergonomic keyboard assembly includes detachable elements made of materials including but not limited to wood, plastic and metal, a set of two split keyboards, and connecting elements, such as bolts, wingnuts and Velcro to maintain appearance.

According to an exemplary embodiment of the present invention, an ergonomic keyboard assembly 100 is disclosed as shown in FIGS. 1 to 4. One or more components to be described in the description are detachable so that the components are replaceable by a user according to various size requirements thereof. FIG. 1 shows a top view of the ergonomic keyboard assembly 100 depicting horizontal angle adjustment. The keyboard assembly 100 includes a first keyboard 101 and a second keyboard 102 each connected to one another via a cable 103. The keyboard assembly 100 further includes a first flat member 104 having a top surface 105 and a bottom surface 106. In a preferred aspect, the first keyboard 101 is positioned on the top surface 105 and connected therewith by one or more connecting elements (not shown). The keyboard assembly 100 also includes a second flat member 108 including a top surface 109 and a bottom surface 110. In a preferred aspect, the second keyboard 102 is positioned on the top surface 109 and connected therewith by one or more connecting elements (not shown). The connecting elements according to this embodiment include Velcro (not shown).

In a preferred embodiment, the first keyboard 101 is positioned on an upper part of the top surface 105 of first flat member 104. The second keyboard 102 is positioned on an upper part of the top surface 109 of second flat member 108. In one specific embodiment, the first and second keyboards 101, 102 are placed at any angle that is comfortable to the user.

Figure 4:
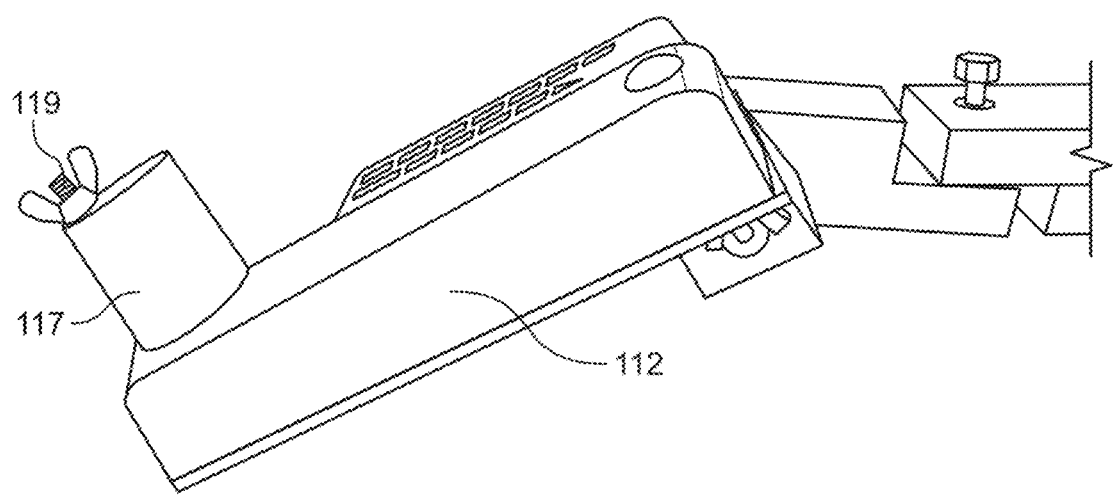
FIG. 4 is a zoomed view of the ergonomic keyboard assembly of FIG. 1 depicting height and position adjustment for wrist.

The keyboard assembly 100 further includes a first elongated member 112 which is positioned on the top surface 105 of the first flat member 104 and connected therewith by one or more connecting elements 113 and a second elongated member 114 positioned on the top surface 109 of the second flat member 108 and connected therewith by one or more connecting elements 116. The keyboard assembly 100 also includes a first cylindrical knob 117 that is rotatably mounted on a top surface of the first elongated member 112 and connected therewith using at least one connecting element 119. A second cylindrical knob 120 is rotatably mounted on a top surface of the second elongated member 114 and connected therewith using at least one connecting element 122. FIG. 4 is a zoomed view of the ergonomic keyboard assembly of FIG. 1 depicting height and position adjustment for wrist. The height of the keyboard assembly 100 is adjusted by varying the width of first and second elongated members 112, 114 according to the hand size of the user in order to adapt to the wrist size of the user. In one aspect, the first and second elongated members 112, 114 are configured as wrist rest modules which are configured to be high enough so that the fingers form the appropriate C shape while typing and while not bending the wrist.

In various aspects of the present invention, the at least one connecting element 119, 122 include bolts, wingnuts, thumbscrews and the like. In a preferred aspect, the first cylindrical knob 117 and the second cylindrical knob 120 are rotatable to adjust to the wrist size of a user. Thus, the user is able to accommodate the wrists in a convenient position.

In a preferred embodiment, the keyboard assembly 100 includes a first L-shaped member 123 that is connected to the bottom surface 106 of the first flat member 104 by one or more connecting elements (not shown) and a second L-shaped member 124 that is connected to the bottom surface 110 of the second flat member by one or more connecting elements (not shown). In one aspect, the first and second L-shaped members 123, 124 are pivotally connected to each other by one or more connecting elements 125. The first and second L-shaped members 123, 124 are rotatable to about 180 degrees, which allows the user to place the keyboard assembly 100 in a desired angle.

Figure 2:
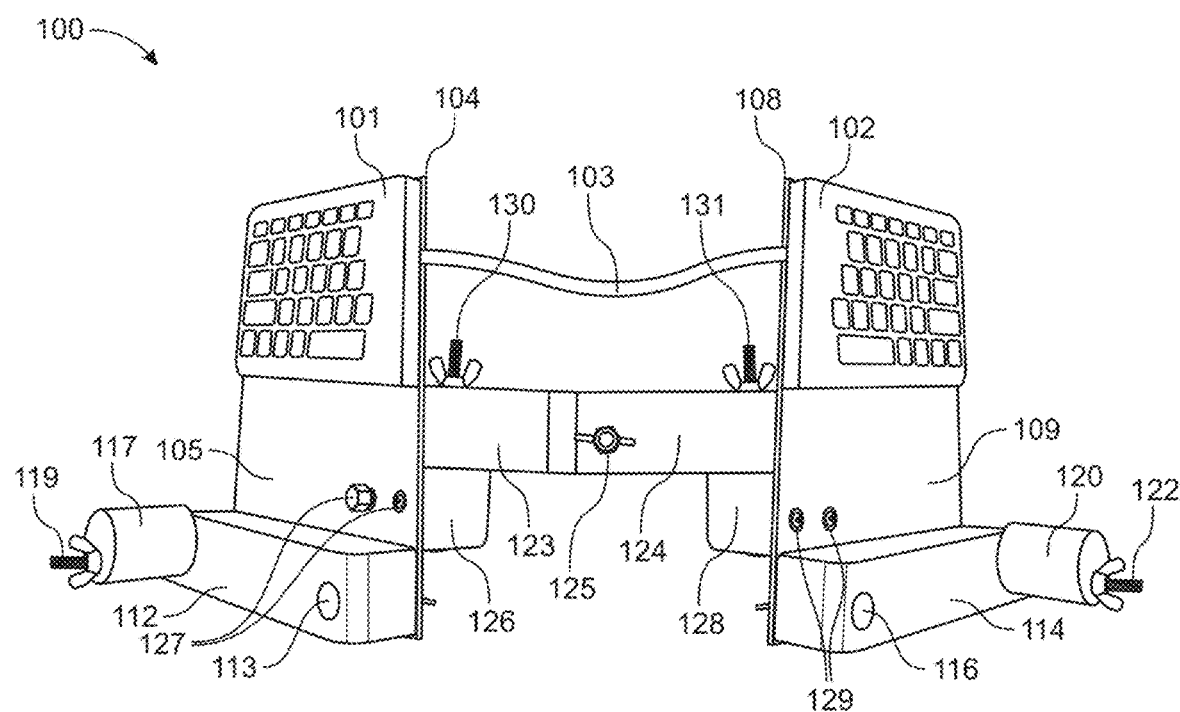
FIG. 2 is a front top view of the ergonomic keyboard assembly of FIG. 1 depicting keyboard adjustment.
Figure 3:
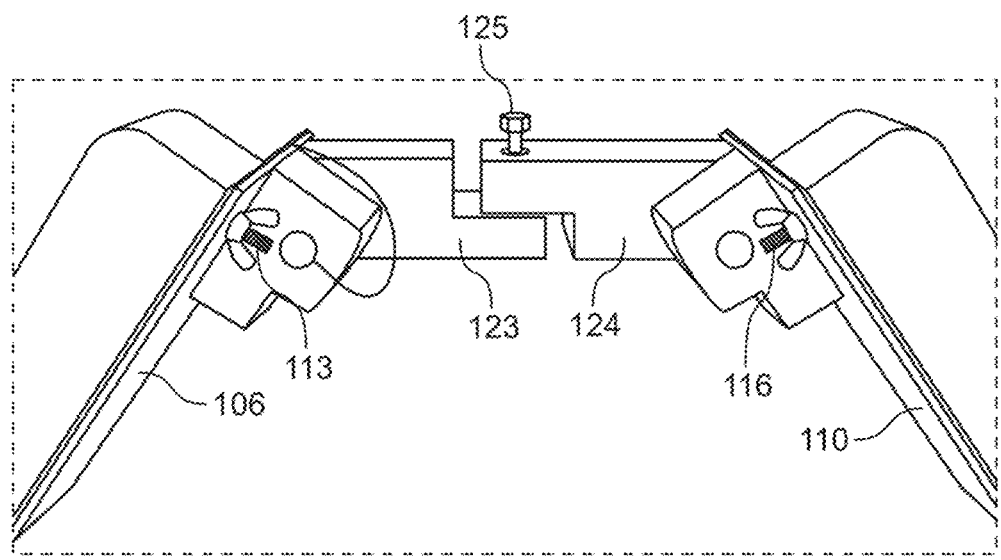
FIG. 3 is a front view of the ergonomic keyboard assembly of FIG. 1 depicting height and angle adjustment.

The present invention further includes a third L-shaped member 126 connected to the bottom surface 106 of the first flat member 104 by one or more connecting elements 127 and movably connected to the first L-shaped member 123 by one or more connecting elements 130. The present invention also includes fourth L-shaped member 128 which is connected to the bottom surface 110 of the second flat member 108 by one or more connecting elements 129 and movably connected to the second L-shaped member 124 by one or more connecting elements 131. In specific embodiment, the first L-shaped member 123 and the second L-shaped member 124 are elongated compared to the third L-shaped member 126 and fourth L-shaped member 128. In a specific embodiment, the connection among first, second, third and fourth L-shaped members 123, 124, 126, 128 allows the first and second keyboards 101, 102 to maintain shoulder-width position, thus eliminating the wrist to remain in bending position while typing the keyboard. FIG. 2 shows a front top view of the ergonomic keyboard assembly 100, wherein the keyboard assembly 100 is adjusted by means of the first and second L-shaped members 123, 124 to orient in a position as shown. FIG. 3 shows another view of a part of the keyboard assembly 100 that depicts the first and second L-shaped members 123, 124 and the connecting elements 125 together form an adjusting means of the keyboard assembly 100. The shoulder-width position is adjustable according to the shoulder size of the user, thus the split keyboards allows the elbows do not need to be close to the body while maintaining a natural elbow position. The shoulder-width position is the length of the first and second L-shaped members 123, 124 through the first flat member 101 to the second flat member 102. The shoulder-width position is adjustable by adding an extension in between the first and second L-shaped members 123, 124 to increase the shoulder-width position or by replacing the first and second L-shaped members 123, 124 of shorter length according to the shoulder size of the user.

In various aspects of the present invention, the one or more connecting elements 113, 116, 119, 122, 125, 127, 129, 130, 131 include bolts, wingnuts, thumbscrews and the like.

The keyboard disclosed herein allows each user to set the keyboard for personal optimum comfort and adjust during course of use to vary the angles while eliminating stress and strain on hands, arms, shoulder and back.

It will finally be understood that the disclosed embodiments are presently preferred examples of how to make and use the claimed invention, and are intended to be explanatory rather than limiting the scope of the invention as defined by the claims below. Reasonable variations and modifications of the illustrated examples in the foregoing written specification and drawings are possible without departing from the scope of the invention as defined in the claim below. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art, and within the scope of any claims that the above disclosure supports. The scope of the invention is accordingly defined by the following claims.

This application is intended to cover any adaptations or variations of the present invention. Therefore, it is manifestly intended that this invention be limited only by the claims and the equivalents thereof.

The invention claimed is:

1. An ergonomic keyboard assembly comprising:
 a first keyboard and a second keyboard each connected via a cable;
 a first flat member including a top surface and a bottom surface,
  wherein the first keyboard is positioned on the top surface of the first flat member and connected therewith by one or more connecting elements;
 a second flat member including a top surface and a bottom surface,
  wherein the second keyboard is positioned on the top surface of the second flat member and connected therewith by one or more connecting elements;
 a first elongated member positioned on the top surface of the first flat member and connected therewith by one or more connecting elements;
 a second elongated member positioned on the top surface of the second flat member and connected therewith by one or more connecting elements;
 a first cylindrical knob rotatably mounted on a top surface of the first elongated member and connected therewith using at least one connecting element;
 a second cylindrical knob rotatably mounted on a top surface of the second elongated member and connected therewith using at least one connecting element;
 a first L-shaped member connected to the bottom surface of the first flat member by one or more connecting elements;
 a second L-shaped member connected to the bottom surface of the second flat member by one or more connecting elements;
  wherein the first and second L-shaped members are pivotally connected to each other by one or more connecting elements;
 a third L-shaped member connected to the bottom surface of the first flat member and movably connected to the first L-shaped member by one or more connecting elements; and
 a fourth L-shaped member connected to the bottom surface of the second flat member and movably connected to the second L-shaped member by one or more connecting elements.

2. The ergonomic keyboard assembly according to claim 1, wherein the one or more connecting elements include bolts, wingnuts, thumbscrews and the like.

3. The ergonomic keyboard assembly according to claim 1, wherein the at least one connecting elements include bolts, wingnuts, thumbscrews and the like.

4. The ergonomic keyboard assembly according to claim 1, wherein the first L-shaped member and the second L-shaped member are elongated compared to the third L-shaped member and fourth L-shaped member.

5. The ergonomic keyboard assembly according to claim 1, wherein the first cylindrical knob and the second cylindrical knob are rotatable to adjust to the wrist size of a user.

6. The ergonomic keyboard assembly according to claim 1, wherein the first keyboard is positioned on an upper part of the top surface of first flat member.

7. The ergonomic keyboard assembly according to claim 1, wherein the second keyboard is positioned on an upper part of the top surface of second flat member.

8. The ergonomic keyboard assembly according to claim 1, wherein the width of the elongated member is varied according to the hand size of the user.

9. The ergonomic keyboard assembly according to claim 1, wherein the first and second keyboards are placed at an angle that is comfortable to the user.

10. The ergonomic keyboard assembly according to claim 1, wherein the connection among first, second, third and fourth L-shaped members allows the first and second keyboards to maintain shoulder-width position, thus eliminating the wrist to remain in bending position while typing the keyboard.

\* \* \* \* \*